Nov. 5, 1940.　　　R. R. DONALDSON, JR　　　2,220,837
COMBUSTION CONTROL SYSTEM
Filed June 4, 1937
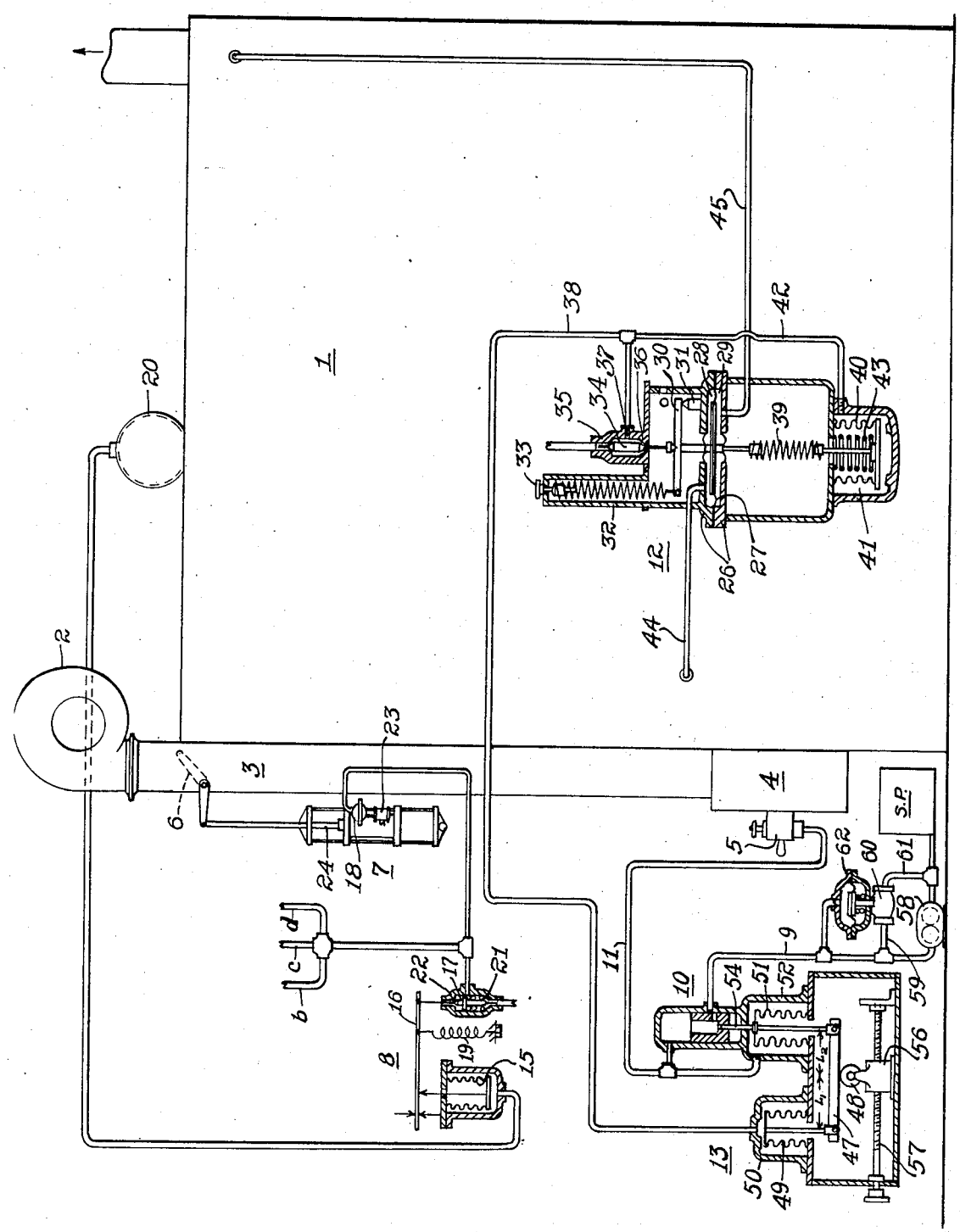
INVENTOR
Robert R. Donaldson Jr.
By Gerald B. Tjoflat
His Attorney Patented Nov. 5, 1940

2,220,837

UNITED STATES PATENT OFFICE 2,220,837

COMBUSTION CONTROL SYSTEM

Robert R. Donaldson, Jr., Pittsburgh, Pa., assignor to John M. Hopwood, Mt. Lebanon, Pa.

Application June 4, 1937, Serial No. 146,430

4 Claims. (Cl. 158—1)

This invention relates to fluid fuel fired furnaces and more particularly to a control system for automatically maintaining a predetermined relationship between the rate of supply of combustion air and the rate of delivery of fuel under conditions where the demand for combustion is variable.

To obtain efficient combustion of fluid fuel, liquid or gaseous, a definite number of cubic feet of air is required for each gallon of liquid fuel, or for each cubic foot of gaseous fuel, of a given B. t. u. content. In accordance with this invention, the rate of supply of one of the constituent elements (air or fuel) essential to combustion is adjusted either automatically or by hand to a value required for a given or required rate of combustion, the rate of delivery of such constituent element is measured and the rate of delivery of the other constituent element is automatically adjusted to maintain the desired ratio between the rates of delivery of these combustion elements.

An object of this invention is to provide an automatic control system for fluid fuel fired furnaces wherein a control impulse is developed, which bears a definite relationship to the rate of delivery of one of the combustion elements (air or fuel), and utilized to change the rate of delivery of the other element until the control impulse is balanced against a pressure which bears a direct relationship to the rate of delivery of such other element.

Another object of the invention is to provide a system having means for measuring the rate of air flow and setting up a control impulse whose magnitude bears a definite relationship to the air flow, and a regulator for controlling the rate of fuel delivery, which is responsive to the air flow impulse and to a function of the rate of flow of fuel and operates to change the fuel rate until the regulator is in balance with the air flow impulse and fuel flow function.

Other objects of the invention will, in part, be apparent and will, in part, be obvious from the following description taken in conjunction with the accompanying drawing in which:

The single figure is a more or less diagrammatic view of a combustion control system embodying one form of the invention, as applied to a liquid fuel fired boiler furnace.

In the firing of furnaces, efficient combustion can only be had by maintaining the proper ratio between the elements essential to combustion, i. e., air and fuel. The rates of delivery of air and fuel must be so coordinated and controlled that the best ratio, once attained by preadjustment, is maintained for all rates of combustion. In accordance with this invention, the rate of delivery of one of the elements essential to combustion is metered or measured and a control impulse is developed whose magnitude bears a definite relationship to the rate of delivery of such element. This impulse is utilized to effect a change in the rate of delivery of the other combustion element and a functaion of the rate of delivery of this combustion element, say pressure, is utilized in conjunction with a regulator which responds also to the control impulse to make such adjustments in the rate of delivery of this combustion element that the regulator is in balance with pressure and control impulses only when the proper ratio exists between the rates of delivery of the combustion elements. Whenever an unbalance occurs, the regulator readjusts the rate of delivery of one or the other of the combustion elements controlled thereby until the regulator is again balanced. In other words, the rate of delivery of air is balanced against the rate of delivery of fuel.

The system embodying the invention may be used to maintain automatically the proper ratio between the rate of delivery of liquid or gaseous fuel and air to furnaces in general, whether manual control is employed to initiate a change in the rate of combustion or whether the combustion rate is automatically controlled in response to changes in temperature in a heating furnace or to changes in demand for steam as in the case of a boiler furnace.

In the drawing, the system is illustrated as applied to a liquid fuel fired boiler furnace I provided with means for initiating or effecting changes in the rate of combustion automatically in accordance with changes in steam pressure i. e., in the demand for steam, although the manner of carrying out manual control of the rate of combustion will be readily apparent to those skilled in the art. The furnace I may be provided with mechanical means for producing the draft required and means for delivering liquid fuel to the furnace. The draft means may be either forced and/or induced.

A forced draft means is illustrated and comprises a blower 2 driven by any type of motor (not shown), that delivers air through a conduit or duct 3 to a receiver 4 having a liquid fuel burner 5 associated therewith. The air and fuel are delivered into the furnace in a thoroughly mixed condition for combustion.

The rate of delivery of air to the furnace is controlled by a damper 6 and a regulator 7. Regulator 7 may be controlled automatically by means of a steam demand responsive device 8, or by hand.

The liquid fuel is delivered under pressure, from a source of supply S. P. through a pipe line 9, valve 10 and pipe 11 to a burner 5. To maintain efficient combustion, the rates of air and fuel delivery must be maintained in a substantially fixed proportion to each other. To maintain the proper fuel-air ratio a device 12 for measuring the rate of delivery of air to the furnace and setting up a pressure impulse whose magnitude is proportional to the air flow, and a regulator 13 governing valve 10 are provided.

Regular 13 responds to the air flow impulse and to a function of the fuel delivery rate, say the pressure of the liquid fuel in pipe 11, and adjusts the fuel delivery rate by actuating valve 10 until the fuel pressure and the air flow impulse are in balance.

Regulator 7 may be of the type disclosed in Patent No. 2,044,936 granted to me on June 23, 1936, and assigned to John M. Hopwood, and regulator 8 of the type disclosed in Fig. 4 of Patent No. 2,030,386 granted February 11, 1936, to P. S. Miller.

Regulator 8 has a pressure element 15 that responds to steam pressure and actuates a lever 16 controlling an escapement valve 17 from which pressure impulses are transmitted to a diaphragm chamber 18 of regulator 7. Movement of lever 16 by bellows 15 is opposed by a tension spring 19 which is adjusted to allow lever 16 to occupy a given position for a given value of steam pressure in the steam header 20. If the steam pressure falls, indicating that a higher rate of combustion is required lever 16 moves in such direction as to move valve 17 towards its inlet port 21 (which port is connected to a source of supply of air at constant pressure) and away from exhaust port 22, whereby the pressure acting on the diaphragm in chamber 18 is reduced. Upon a reduction in pressure in chamber 18, pilot valve 23 is moved in a direction to cause piston rod 24 of regulator 7 to move downwardly and increase the opening of damper 6. This results in an increased rate of air supply to the furnace which, being measured by device 12, causes regulator 13 to become unbalanced in a direction requiring increased fuel flow to the furnace. When the increased fuel flow has been brought up to the value required by the increased rate of air flow, device 13 is balanced and no further increase in fuel flow occurs.

If the steam pressure continues to fall, regulator 8 causes regulator 7 to open the damper further, with the resultant increase in air and fuel flow and a higher rate of combustion. When the combustion rate has been increased sufficiently to restore the steam pressure to the proper value, no further adjustments in the fuel and air delivery rates take place.

If the steam pressure rises above the value desired, indicating a decreasing demand for steam, valve 17 is moved towards exhaust port 22 and away from the inlet port 21, whereby an increased pressure impulse is sent to chamber 18 causing valve 23 to move in a direction that will cause piston rod 24 to move upwardly and decrease the opening of damper 6. This decrease in damper opening decreases the rate of air supply, which decrease is measured by device 12, causing regulator 13 to decrease the rate of fuel supply in proportion to the reduction in the air supply. Further increases in steam pressure occasion further reductions in the rates of air and fuel supply until the rate of combustion has been reduced to meet the load requirements.

Where more than one boiler furnace is involved and all boilers are connected to a common steam header, the system illustrated herein can be utilized to control all of the furnaces and each furnace can be made to take its share of the total load. In such case the master regulator 8 would be connected by pipes b, c, d, etc., to the draft regulator 7 of each individual furnace and each furnace would be supplied with a regulator 12 and a regulator 13 for maintaining the desired standards and the required rates of combustion.

Regulator 12 comprises a housing 26 in which a diaphragm 27 is disposed and divides the housing into two chambers 28 and 29. One side of the diaphragm is connected to a lever 30 one end of which rests on a knife edge 31 and the other end of which is connected to a tension spring 32. The spring is disposed within a tubular support and connected at its upper end to an adjustment 33 whereby the spring tension may be varied.

Movements of lever 30 are utilized to actuate an escapement valve 34 that controls the delivery of air flow-rate impulses to regulator 13. When valve 34 is moved upwardly toward inlet port 35 and away from exhaust port 36 (a condition corresponding to a decrease in air flow through the furnace) the pressure impulses transmitted through outlet port 37 and pipe 38 to device 13 are decreased, the amount of decrease depending on the amount of movement toward the inlet port 35. If lever 30 moves in the opposite direction, valve 34 moves towards the exhaust port and away from the inlet port 35, (a condition corresponding to increased air flow to the boiler) the air-flow pressure impulses delivered to device 13 increase, the amount of increase depending on the extent of movement of valve 34 in the direction under consideration.

The lower side of diaphragm 27 is connected, preferably by a spring 39, to a bellows 40 disposed in a pressure tight chamber 41 which is connected by a pipe 42 to the outlet of valve 34. This bellows works against a loading spring 43 and spring 39 so that for each value of pressure delivered to the chamber, bellows 40 and spring 39 will expand or contract a definite amount.

If bellows 40 is made of a metal having sufficient stiffness and resiliency as will cause it to act like a spring, spring 43 may be omitted.

The function of bellows 40 and spring 39 is to supply a gradient to diaphgram or pressure responsive element 27 that will cause this element to come to rest in a different but definite position for each value of air flow and at the same time keep the total travel or movement of this member within small limits. The travel of bellows 40 and the movement of spring 39 compared to the travel of element 27 is many times greater. For example, the total travel of element 27 required to shift valve 34 from one extreme position to the other might be 0.010 inch, whereas the travel of bellows 40 and spring 39 corresponding to the travel of element 27 might be two inches, or the rates of travel of bellows 40 and spring 39 to the travel of element 27 would be 200 to 1.

For a condition corresponding to zero air flow through the furnace, spring 32 would be so adjusted that inlet port 35 is closed by valve 34 and that the tension in spring 39 is zero, that is the spring would be neither in tension nor in compression. The travel of bellows 40 should be such as to prevent valve 34 from closing port 36 until the condition of maximum air-flow through the furnace occurs.

With this arrangement it will be apparent that every position of element 27 within its limits of travel represents a definite value or rate of air air flow and that every value of pressure established in pipe 38 by valve 34 represents a definite value of rate of air flow. This is accomplished with a small travel of element 27 by employing a gradient producing means having a wide range of travel thereby substantially eliminating error and giving to device 12 true metering characteristics. If the range of travel of bellows 40 and spring 39 were somewhat near the range of travel of element 27, the characteristics of the bellows and spring would have to be such that error would result. On the other hand, if all the gradient required were supplied by spring 32, then a pressure element having a large travel would be required and this at the expense of sensitivity to a very large degree.

The upper side of diaphragm 27 is connected by a pipe 44 to the combustion chamber of the furnace and therefore is subjected to the pressure of the air delivered to the furnace, and the lower side of the diaphragm is connected by pipe 45 to the outlet of the furnace. Thus the diaphragm will respond to the draft loss across the furnace passes which is a measure of the rate of air supply to the furnace. Since for each value of draft across the furnace, i. e., for each value of rate of air flow, there will be a definite position for diaphragm 27, and consequently there will be a definite value of pressure impulse delivered to bellows chamber 41 and to device 13. In other words, the magnitude of the pressure impulses delivered through the outlet of valve 34 will bear a definite relationship to the rate of air flow to the furnace.

While I have illustrated one way of measuring the air flow, i. e., by measuring a pressure difference between two points in the path of the air flow, it will be appreciated by those skilled in this art that if a preheater or economizer is employed, the pressure drop across an orifice or other fixed resistance in the path of air flow may be utilized to flex element 27 to set up the impulses in line 38 corresponding to the flow being measured.

Device 13 is designed to maintain a rate of delivery of liquid fuel to the furnace that bears a definite relationship to the rate of air flow so that the proper fuel and air rates will be maintained for all rates of combustion.

Device 13 comprises a lever 47 supported on a fulcrum 48 and acted on at one end by a pressure responsive element 49, such as a bellows, disposed in a pressure-tight chamber 50 to which the air-flow impulses are delivered by pipe 38. The other end of the lever is acted upon by a pressure-responsive element 51, such as a bellows, disposed within a pressure-tight chamber 52. Bellows 52 is connected by a stem 54 to valve 10 and operates it in accordance with the pressure impulses acting on the lever 47. Chamber 52 is connected to fuel line 11 and therefore responds to the pressure and the rate of liquid fuel delivered to the furnace.

Whenever the forces exerted by bellows 49 and 51 on lever 47 are in balance, a condition which causes the lever to remain fixed in a given position, the rates of air flow and fuel flow to the furnace are in balance and in the right proportion to each other. If the air flow rate changes, say it increases, the pressure on bellows 49 increases, increasing the opening of valve 10 and the rate of fuel flow to the furnace. As the valve opens wider, the pressure acting on bellows 51 increases and when it reaches a value sufficient to equalize the force exerted by bellows 49, lever 47 will come to rest at the point where the proper amount of fuel is delivered to the furnace. If the oil pressure should increase, or decrease, without any change in air flow rate, lever 47 becomes unbalanced in a direction that will result in valve 10 being adjusted to the proper degree of opening.

In order to provide means for accommodating the system to various grades of fuel, requiring more or less air for combustion, or to provide for adjusting the rates of air or fuel feed for any given fuel to obtain proper combustion, fulcrum 48 is made adjustable along lever 47 by mounting it on a support 56 having threaded engagement with a screw 57. By turning this screw one way or the other the fulcrum can be moved towards or to either side of the center of the lever. The closer the fulcrum is towards the point where bellows 51 acts on lever 47, the greater will be the rate of fuel flow for a given rate of air flow, and the farther it is away from this point the lower will be the rate of fuel flow for a given rate of air flow.

For a given setting of fulcrum 48, it will be apparent that lever 47 will be in a state of balance, that is at rest, when the force exerted by bellows 49 on lever 47 multiplied by lever arm $L_1$, is equal to the force exerted by bellows 51 on the lever multiplied by lever arm $L_2$. Since for a given regulator, the bellows areas remain the same, it can be stated that the regulator is in balance when the equation $(A. I.) = K(O. I.)$ where (A. I.) is magnitude of the air-flow impulse in pounds per square inch acting on bellows 49, (O. I.) is the magnitude of the pressure of the liquid fuel in pounds per square inch, acting on bellows 51 and K is a factor of proportionality $$\left(\frac{A.I.}{O.I.}\right)$$

The value of K can be changed by merely changing the position of fulcrum 48, but for any position it will be apparent that the air flow fuel flow ratio $$\left(\frac{A.I.}{O.I.}\right)$$

must be maintained or brought to a constant value in order to maintain regulator 13 in a state of balance.

As stated previously herein, the liquid fuel may be delivered in any suitable manner from the supply source to the furnace so long as the pressure on the outlet side of valve 10 is maintained at the proper value, since bellows 51 responds to only the pressure on the discharge side of the valve. The liquid fuel may conveniently be delivered from the source by means of a pump 58, the outlet of which delivers into pipe 9 to valve 10 and to a by-pass including pipe 59, connected to pipe 9, an automatic valve 60 and a pipe 61 leading to the intake of the pump.

Valve 60 is operated by a diaphragm 62 which responds to the pressure on the inlet side of valve 10. This valve opens or closes more or less to regulate the amount of fuel by-passed to the intake of the pump to thereby insure the maintenance of the required pressure in pipe 11.

In case the furnace is fired with gaseous fuel, regulator 13 would be modified by substituting for valve 10, a valve designed to pass and control the required amount of gas and by so increasing the area of bellows or element 51 that a sufficient force would be supplied by the fuel pressure to balance the force exerted by the air flow actuated element 49 on lever 47. Regulator 13 with such modifications would function in the same manner as described for the regulator as illustrated.

The control system herein shown and described is adaptable for use, without change in design, on various furnaces where the range of draft loss change may vary widely. When such variation is experienced, all that is required is to supply a spring 39 that will allow full travel of element 27 for a full change in air flow occurring in a change from minimum to maximum furnace rating or load. Whatever the draft loss may be in a change from minimum to maximum rating, this loss is multiplied in magnitude by valve 34 for use in balancing the effect of the air flow and fuel rates on regulator 13, thereby maintaining the proper ratio between the air and fuel.

Having thus described the invention, what I claim as new and desire to secure by Letters Patent is:

1. A control system for maintaining a proportional relation between the rates of delivery of combustion air and fluid fuel to a furnace for varying rates of combustion, comprising means for measuring the rate of air flow to the furnace and setting up a control impulse whose magnitude bears a definite relationship to the rate of air flow, means for delivering fluid fuel to the furnace, a device for regulating the rate of flow of said fuel to the furnace, a regulator responsive to and disposed to be in balance with the air flow control impulse and the pressure of the fuel delivered to the furnace for controlling the fuel delivery rate in accordance with the amount of unbalance between said impulse pressure and fuel pressure to maintain a fixed relation between the air and fuel delivery rates.

2. A control system according to claim 1 wherein the regulator is balanced when the air-flow impulse (A. I.) is equal to a constant (K) multiplied by the fuel pressure (O. P.) and provided with means for adjusting at will the value of (K.)

3. In a control system for fluid fuel fired furnaces provided with a source of supply of forced draft, the combination with means for measuring the rate of flow of air through the furnace and setting up a control impulse whose magnitude bears a definite relationship to the rate of air flow, and means for delivering fluid fuel to the furnace under pressure, of means for controlling the rate of flow of fuel to the furnace, and means responsive to the pressure of the fuel delivered to the furnace and to said air flow impulse for actuating said fuel controlling means in such manner as to maintain the action of said fuel pressure and air flow impulses on said responsive means in balance.

4. A control system for a furnace comprising a regulator having a valve for controlling the flow of fluid fuel to the furnace, a lever for actuating the valve, a pressure impulse responsive element and an element responsive to the fuel pressure at the outlet of said valve, connected in opposition to said lever so that said valve is actuated to increase or decrease the rate of flow of fuel to thereby maintain the forces exerted by said elements on the lever in balance, and means responsive to air flow to the furnace for transmitting a control impulse to said impulse responsive element whose magnitude bears a definite relation to the rate of air flow, whereby a fixed relation between the rates of fuel and air delivery is maintained.

ROBERT R. DONALDSON, Jr.